United States Patent
Wu

(10) Patent No.: US 12,033,677 B2
(45) Date of Patent: Jul. 9, 2024

(54) HARD DISK INDICATOR CIRCUIT AND HARD DISK BACKPLANE

(71) Applicant: Fulian Precision Electronics (Tianjin) Co., LTD., Tianjin (CN)

(72) Inventor: Hong-Shuang Wu, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 18/132,121

(22) Filed: Apr. 7, 2023

(65) Prior Publication Data
US 2023/0333951 A1    Oct. 19, 2023

(30) Foreign Application Priority Data
Apr. 19, 2022   (CN) .......................... 202210409174.8

(51) Int. Cl.
*G11B 5/455* (2006.01)
*G06F 11/22* (2006.01)
*G06F 11/273* (2006.01)

(52) U.S. Cl.
CPC .......... *G11B 5/455* (2013.01); *G06F 11/2205* (2013.01); *G06F 11/273* (2013.01)

(58) Field of Classification Search
None
See application file for complete search history.

(56) References Cited

U.S. PATENT DOCUMENTS

| | | | |
|---|---|---|---|
| 6,574,751 B1* | 6/2003 | Lee ...................... | G11B 19/048 714/21 |
| 10,636,452 B1* | 4/2020 | Yang ...................... | G11B 27/36 |
| 2003/0046471 A1* | 3/2003 | Sivertsen .............. | G06F 3/0658 710/305 |
| 2005/0128626 A1* | 6/2005 | Suzuki ................. | G11B 19/209 360/71 |
| 2006/0055971 A1* | 3/2006 | Fukuhara ............ | G06F 11/0748 358/1.16 |
| 2006/0236161 A1* | 10/2006 | Tanaka ................. | G06F 11/004 |
| 2009/0135698 A1* | 5/2009 | Fujibayashi .......... | G06F 11/325 369/53.42 |
| 2011/0018440 A1* | 1/2011 | Fukuda ................. | G11B 33/10 362/296.01 |

(Continued)

FOREIGN PATENT DOCUMENTS

| CN | 113835971 A | 12/2021 |
|---|---|---|
| TW | 201423395 A | 6/2014 |
| TW | 201510993 A | 3/2015 |

*Primary Examiner* — Peter Vincent Agustin
(74) *Attorney, Agent, or Firm* — ScienBiziP, P.C.

(57) ABSTRACT

The present disclosure provides a hard disk indicator circuit and a hard disk backplane. The hard disk indicator circuit includes an indicating unit, a control unit, a drive unit and a verification unit. The indicating unit indicates state of the hard disk. The control unit detects the state of the hard disk and outputting a control signal according to the state of the hard disk. The drive unit receives the control signal and lights the indicating unit according to the control signal. The verification unit obtains a level value of the indicating unit and determines whether the indicating unit is faulty according to the level value and the control signal. The present disclosure can quickly and accurately obtain the fault state of the hard disk indicator, save manpower and improve the fault detection efficiency.

20 Claims, 3 Drawing Sheets

(56) References Cited

U.S. PATENT DOCUMENTS

| | | | | |
|---|---|---|---|---|
| 2014/0189168 A1* | 7/2014 | Chen | ................... | G06F 3/0673 |
| | | | | 710/19 |
| 2016/0334855 A1* | 11/2016 | Chan | ................... | G06F 1/3268 |
| 2023/0333951 A1* | 10/2023 | Wu | ..................... | G11B 5/455 |

* cited by examiner

HARD DISK INDICATOR CIRCUIT AND HARD DISK BACKPLANE

FIELD

The present disclosure relates to the field of server technology, in particular to a hard disk indicator circuit and a hard disk backplane.

BACKGROUND

A hard disk backplane can accommodate multiple hard disks, and the hard disk backplane is provided with a hard disk indicator light, which is used to indicate the working status of the hard disk. A user needs to visually observe whether the hard disk indicator is faulty. Such a design may be inconvenience to detect faults, and the detection accuracy is not high.

Therefore, improvement is desired.

DETAILED DESCRIPTION

In the embodiment of the present disclosure, words such as "first" and "second" are only used to distinguish different objects and cannot be understood as indicating or implying relative importance or indicating or implying order. For example, the first application, the second application, and the like are used to distinguish different applications, not to describe the specific order of applications. The features defined as "first" and "second" can explicitly or implicitly include one or more of these features.

Figure 1:
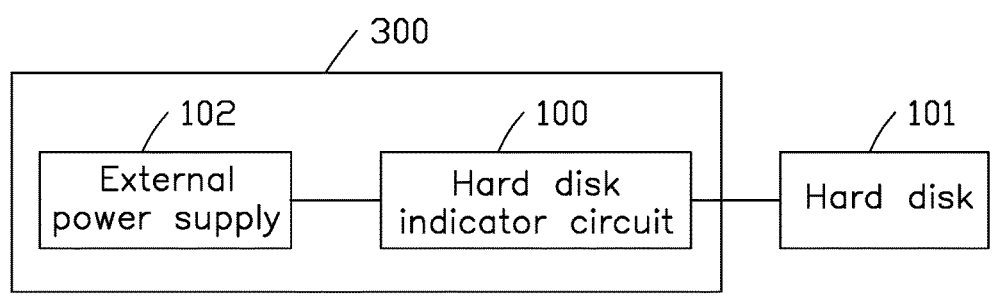
FIG. 1 is a schematic diagram of a hard disk indicator circuit according to an embodiment of the present disclosure.

FIG. 1 illustrates a hard disk backplane 300 in accordance with an embodiment of the present disclosure.

The hard disk backplane 300 includes an external power supply 102 and a hard disk indicator circuit 100. The hard disk indicator circuit 100 is electrically coupled to the hard disk 101 and the external power supply 102. The hard disk indicator circuit 100 includes at least one hard disk indicator. The hard disk indicator circuit 100 can detect the state of the hard disk 101 in real time and light up the corresponding hard disk indicator according to the state of the hard disk 101. For example, the hard disk indicator circuit 100 may include a first indicator, a second indicator, and a third indicator. When the hard disk 101 is inserted into the hard disk backplane 300 (when the hard disk 101 is connected to the hard disk indicator circuit 100), the hard disk indicator circuit 100 can turn on the third indicator, and the third indicator is used to indicate the presence of the hard disk 101. When the hard disk 101 is in the process of read-write operation, the hard disk indicator circuit 100 can turn on the first indicator, and the first indicator is used to indicate the read-write state of the hard disk 101. When the hard disk 101 fails, the hard disk indicator circuit 100 can turn on the second indicator, and the second indicator is used to indicate the failure state of the hard disk 101.

In some embodiments, the external power supply 102 is used to power the hard disk indicator circuit 100. The hard disk 101 may include a non-volatile memory host controller interface (NVME) hard disk, a serial attached small computer system interface (SAS) hard disk, and a serial advanced technology attachment (SATA) hard disk.

Figure 2:
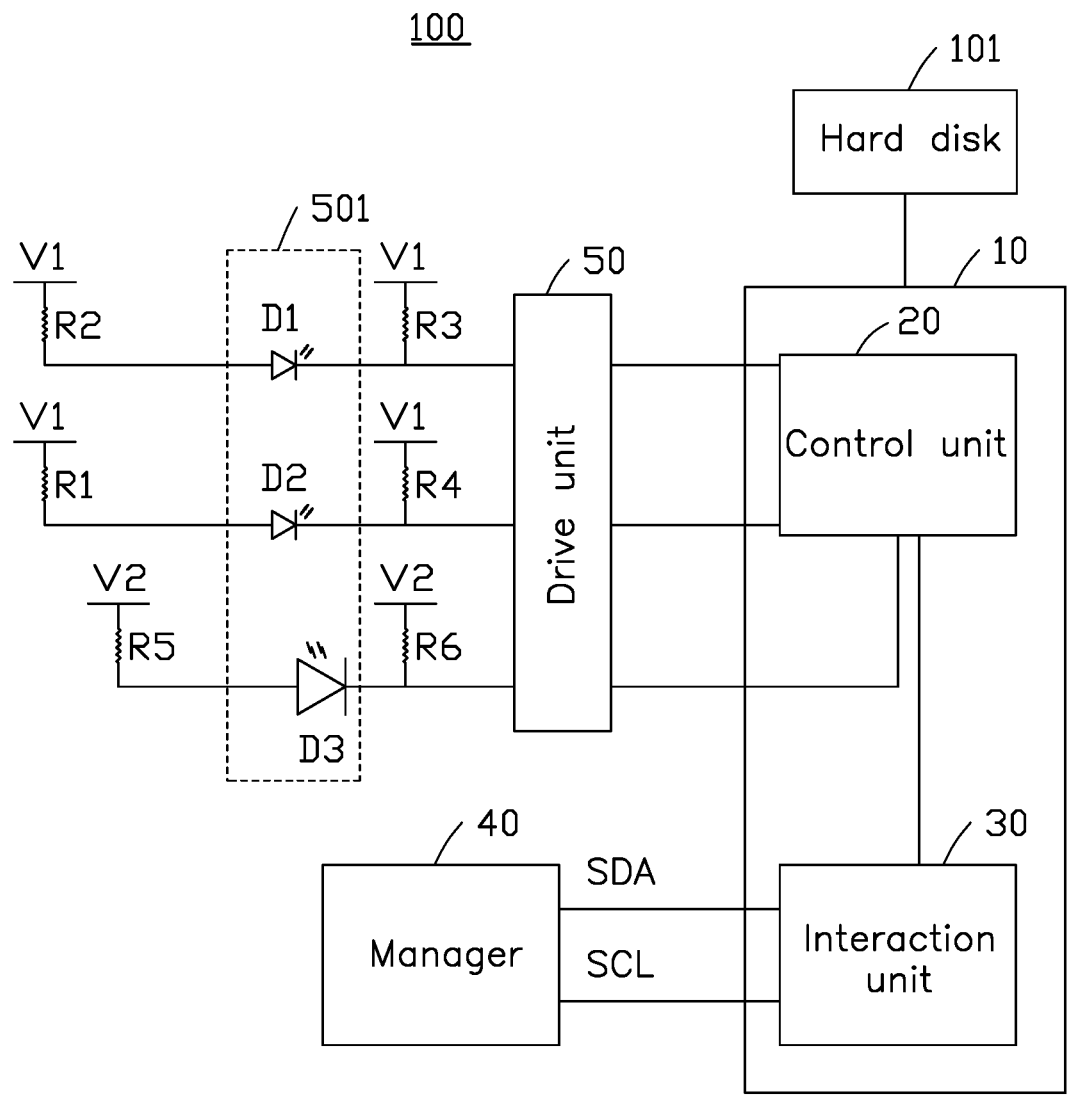
FIG. 2 is a circuit diagram of the hard disk indicator circuit according to an embodiment of the present disclosure.

FIG. 2 shows a circuit diagram of the hard disk indicator circuit 100 in accordance with an embodiment of the present disclosure.

The hard disk indicator circuit 100 includes a complex programmable logic device (CPLD) 10, a drive unit 50, an indicating unit 501, a manager 40, and six resistors R1-R6. The indicating unit 501 includes a first indicator D1, a second indicator D2, and a third indicator D3. In the embodiment, the complex programmable logic device 10 includes a control unit 20 and an interaction unit 30. The complex programmable logic device 10 is electrically connected to the hard disk 101.

The control unit 20 is electrically connected to the drive unit 50 and the interaction unit 30. The interaction unit 30 is electrically connected to the manager 40. The drive unit 50 is electrically connected to the first end of the first indicator D1, the first end of the second indicator D2, and the first end of the third indicator D3. The drive unit 50 is electrically connected to the first end of the resistor R3 and the first end of the resistor R4. The second end of the first indicator D1 is electrically connected to the first end of the resistance R2, the second end of the second indicator D2 is electrically connected to the second end of the resistor R1. The second end of the resistor R1, second end of the resistor R2, the second end of the resistor R3 and second end of the resistor R4 receive a first voltage V1, and the first voltage V1 is supplied by the external power supply 102. In some embodiments, the control unit 20 may be a controller.

The first end of the third indicator D3 is electrically connected to the first end of the resistor R6, and the second end of the third indicator D3 is electrically connected to the first end of the resistor R5. The second end of the resistor R6 and the second end of the resistor R5 receive a second voltage V2, and the second voltage V2 is provided by the external power supply 102.

The first indicator D1, the second indicator D2 and the third indicator D3 are light-emitting diode (LED). The first end of the first indicator D1, the first end of the second indicator D2, and the first end of the third indicator D3 are the cathode of the LED, and the second end of the first indicator D1, the second end of the second indicator D2, and the second end of the third indicator D3 are the anode of the LED.

In some embodiments, the first voltage V1 can be 3.3V, the second voltage V2 can be 5V or 12V, and the drive unit 50 can be a chip. In one embodiment, the drive unit 50 can be a 74LVC07A integrated circuit chip. The interaction unit 30 and the manager 40 can conduct data interaction through the I2C bus. The interaction unit 30 and the manager 40 are electrically connected through the clock bus SCL and the data bus SDA. The data bus SDA is used to transfer data. The clock bus SCL is used to transmit clock signals to control the time when the interaction unit 30 transmits data with the manager 40.

The hard disk indicator circuit 100 can light up the corresponding hard disk indicator according to the state of the hard disk 101. For example, the control unit 20 can output a control signal to the drive unit 50 according to the state of the hard disk 101. The control signal can include a first control signal, a second control signal and a third control signal. When the hard disk 101 is electrically connected to the complex programmable logic device 10, the control unit 20 can output the third control signal to the drive unit 50, the third control signal is used to control the drive unit 50, to turn on the third indicator D3 to indicate that the hard disk 101 is in place. When the hard disk 101 is reading and writing, the control unit 20 outputs the first control signal to the drive unit 50, the first control signal is used to control the drive unit 50, to turn on the first indicator D1 to indicate that the hard disk 101 is in a reading and writing state. When the hard disk 101 is in a fault state, the control unit 20 outputs the second control signal to the drive unit 50, the second control signal is used to control the drive unit 50, to turn on the second indicator D2 to indicate that the hard disk 101 has failed. In some embodiments, the drive unit 50 may be a drive circuit.

In some embodiments, the manager 40 is the baseboard management controller (BMC). The manager 40 includes a display unit, and the hard disk indicator circuit 100 can control the display unit of the manager 40 to display the state of the hard disk according to the state of the hard disk 101. Optionally, the complex programmable logic device 10 outputs the state information to the interaction unit 30 according to the state of the hard disk 101, the interaction unit 30 transmits the state information to the manager 40 through the I2C bus, and the manager 40 displays the state of the hard disk on its display unit according to the state information.

If the first indicator D1, the second indicator D2 and the third indicator D3 fail, since the first indicator D1, the second indicator D2, and the third indicator D3 are not electrically connected to the interaction unit 30 or the manager 40, the interaction unit 30 or the manager 40 cannot learn the fault conditions of the first indicator D1, the second indicator D2, and the third indicator D3. Therefore, the manager 40 cannot indicate the fault state of the first indicator D1, the second indicator D2, and the third indicator D3, it can only manually determine whether the first indicator D1, the second indicator D2, and the third indicator D3 have faults, the efficiency is low and the error rate is high, it is impossible to quickly and accurately obtain the fault judgment results of the first indicator D1, the second indicator D2, and the third indicator D3.

Figure 3:
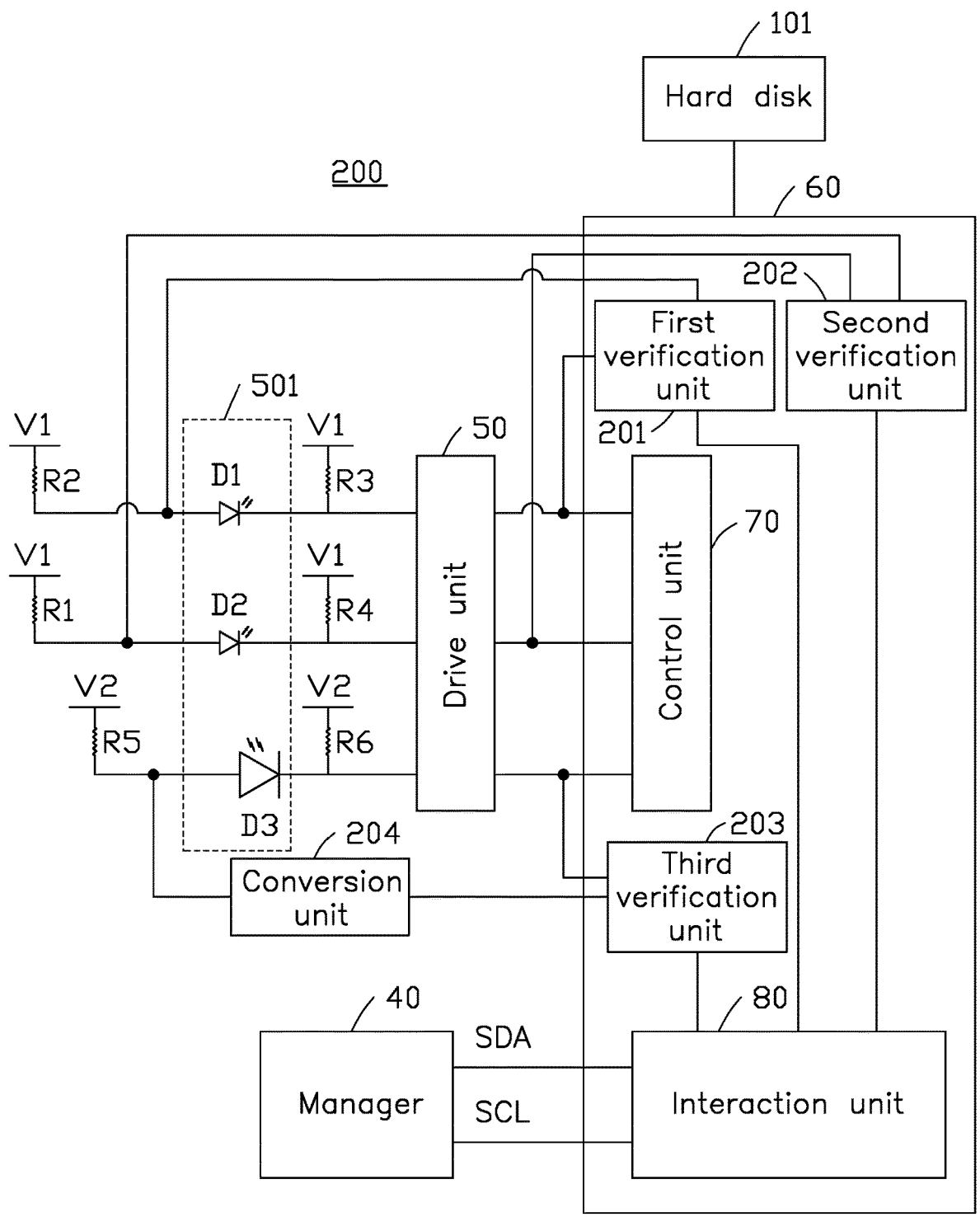
FIG. 3 is a circuit diagram of the hard disk indicator circuit according to another embodiment of the present disclosure.

FIG. 3 shows a circuit diagram of a hard disk indicator circuit control unit 200 in accordance with another embodiment of the present disclosure.

The difference from the hard disk indicator circuit 100 shown in the embodiment of FIG. 2 is that: as shown in FIG. 3, in the embodiment, the hard disk indicator circuit control unit 200 includes a complex programmable logic device 60, the complex programmable logic device 60 includes an interaction unit 80 and a verification circuit. The verification circuit includes a first verification unit 201, a second verification unit 202, a third verification unit 203, and a conversion unit 204. In some embodiments, the conversion unit 204 may be a conversion circuit. In another embodiment, the conversion unit 204 may be a converter for voltage conversion.

The first input end of the first verification unit 201 is electrically connected to the anode of the first indicator D1, and the second input end of the first verification unit 201 is electrically connected to the first output end of the control unit 70 and the first input end of the drive unit 50. It can be understood that the first verification unit 201 can be a first verification circuit.

The first input end of the second verification unit 202 is electrically connected to the anode of the second indicator D2, and the second input end of the second verification unit 202 is electrically connected to the second output end of the control unit 70 and the second input end of the drive unit 50. It can be understood that the second verification unit 202 can be a second verification circuit.

The first input end of the third verification unit 203 is electrically connected to the anode of the third indicator D3, and the second input end of the third verification unit 203 is electrically connected to the third output end of the control unit 70 and the third input end of the drive unit 50. It can be understood that the third verification unit 203 can be a third verification circuit.

In the embodiment, the drive unit 50 adopts the open drain (OD) output mode, when the input signal of the drive unit 50 is a low-level signal, the drive unit 50 outputs a low-level signal; when the input signal of the drive unit 50 is a high-level signal, the output of the drive unit 50 is in a high impedance state, and the high impedance state can be regarded as an open circuit of the drive unit 50. For example, when the hard disk 101 is reading and writing, the control unit 70 outputs a first control signal at the low level to the drive unit 50, and the drive unit 50 outputs a low-level signal to the cathode of the first indicator D1, since the anode potential of the first indicator D1 is the first voltage V1, which is in a high level state, the first indicator D1 is on and on, and the anode potential of the first indicator D1 becomes low. When the hard disk 101 does not perform a read/write operation, the control unit 70 outputs a first control signal at the high-level to the drive unit 50, and the drive unit 50 outputs a high impedance state, the cathode potential of the first indicator D1 is pulled up by the resistor R3 to the second voltage V2, which is in a high-level state. Therefore, both the anode and cathode of the first indicator D1 are in a high-level state, and the first indicator D1 is disconnected and does not emit light.

The verification circuit is used to detect whether the anode potential of the indicator is the same as the level of the control signal, determine whether the indicator has a fault according to the detection result, and output the fault signal including the fault information of the indicator to the interaction unit 80. For example, if the first verification unit 201 detects that the anode of the first indicator D1 is high-level and the first input end of the control unit 70 is low level, it determines that the first indicator D1 is faulty and transmits the first fault signal to the interaction unit 80. It can be understood that the second verification unit 202 can transmit the second fault signal to the interaction unit 80.

Since the anode voltage of the third indicator D3 is the second voltage V2, the conversion unit 204 is used to convert the second voltage V2 to the first voltage V1, so that the third verification unit 203 can determine whether the third indicator D3 is faulty according to the first voltage V1 and the level of the third output end of the control unit 70. When the third indicator D3 fails, the third verification unit 203 can transmit the third failure signal to the interaction unit 80.

In the embodiment, the interaction unit 80 transmits the fault signal to the manager 40 to indicate the fault information of the indicator. When the manager 40 receives the first fault signal output by the interaction unit 80, the manager 40 displays the first indicator D1 on its display unit as faulty. When the manager 40 receives the second fault signal output by the interaction unit 80, the manager 40 displays the second indicator D2 on its display unit as faulty. When the manager 40 receives the third fault signal output by the interaction unit 80, the manager 40 displays that the third indicator D3 on its display unit is faulty.

The hard disk indicator circuit 200 provided by the embodiment of the present disclosure can quickly and accurately obtain the fault state of the hard disk indicator by setting a verification circuit and display it through the display unit of the manager, saving labor and improving the fault detection efficiency.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A hard disk indicator circuit comprising:
   an indicating unit configured for indicating states of the hard disk;
   a control unit configured for detecting the states of the hard disk and outputting a control signal according to the states of the hard disk;
   a drive unit configured for receiving the control signals and controlling the indicating unit to emit light beams according to the received control signals; and
   a verification unit configured for obtaining level state of the indicating unit and determining whether the indicating unit is faulty according to the level value and the control signals.

2. The hard disk indicator circuit of claim 1, wherein when the hard disk is in a first state, the control unit outputs a first control signal to the drive unit; when the hard disk is in a second state, the control unit outputs a second control signal to the drive unit; and when the hard disk is in a third state, the control unit outputs a third control signal to the drive unit.

3. The hard disk indicator circuit of claim 2, wherein the indicating unit comprises a first indicator, a second indicator and a third indicator, the drive unit is configured to control the first indicator to emit light beams when the drive unit receives the first control signal.

4. The hard disk indicator circuit of claim 3, wherein the indicating unit further comprises a second indicator, the drive unit is further configured to control the second indicator to emit light beams when the drive unit receives the second control signal.

5. The hard disk indicator circuit of claim 4, wherein the indicating unit further comprises a third indicator, the drive unit is further configured to control the third indicator to emit light beams when the drive unit receives the third control signal.

6. The hard disk indicator circuit of claim 5, wherein when level state of the first indicator is different from a level value of the first control signal, the verification unit outputs a first fault signal.

7. The hard disk indicator circuit of claim 6, wherein when level state of the second indicator is different from a level value of the second control signal, the verification unit outputs a second fault signal.

8. The hard disk indicator circuit of claim 7, further comprising a conversion unit, wherein the conversion unit is electrically connected to the third indicator and the verification unit, the conversion unit is configured to convert a first level value of the third indicator into a second level value; when the second level value is different from the level value of the control signal, the verification unit outputs a third fault signal.

9. The hard disk indicator circuit of claim 1, further comprising an interaction unit, wherein the interaction unit is electrically connected to the verification unit and a manager; the interaction unit is configured to control the manager to display faulty states of the indicating unit according to faulty signals output by the verification unit.

10. The hard disk indicator circuit of claim 5, wherein the first indicator, the second indicator and the third indicator are light emitting diode (LED).

11. A hard disk backplane comprising:
    a hard disk indicator circuit comprising:
        an indicating unit configured for indicating states of the hard disk;
        a control unit configured for detecting the states of the hard disk and outputting a control signal according to the states of the hard disk;
        a drive unit configured for receiving the control signal and lighting the indicating unit according to the control signal; and
        a verification unit configured for obtaining level state of the indicating unit and determining whether the indicating unit is faulty according to the level value and the control signal.

12. The hard disk backplane of claim 11, wherein when the hard disk is in a first state, the control unit outputs a first control signal to the drive unit; when the hard disk is in a second state, the control unit outputs a second control signal to the drive unit; and when the hard disk is in a third state, the control unit outputs a third control signal to the drive unit.

13. The hard disk backplane of claim 12, wherein the indicating unit comprises a first indicator, a second indicator and a third indicator, the drive unit is configured to control the first indicator to emit light beams when the drive unit receives the first control signal.

14. The hard disk backplane of claim 13, wherein the indicating unit further comprises a second indicator, the drive unit is further configured to control the second indicator to emit light beams when the drive unit receives the second control signal.

15. The hard disk backplane of claim 14, wherein the indicating unit further comprises a third indicator, the drive unit is further configured to control the third indicator to emit light beams when the drive unit receives the third control signal.

16. The hard disk backplane of claim 15, wherein when level state of the first indicator is different from a level value of the first control signal, the verification unit outputs a first fault signal.

17. The hard disk backplane of claim 16, wherein when level state of the second indicator is different from a level value of the second control signal, the verification unit outputs a second fault signal.

18. The hard disk backplane of claim 17, further comprising a conversion unit, wherein the conversion unit is electrically connected to the third indicator and the verification unit, the conversion unit is configured to convert a first level value of the third indicator into a second level value; when the second level value is different from the level value of the control signal, the verification unit outputs a third fault signal.

19. The hard disk backplane of claim 11, further comprising an interaction unit, wherein the interaction unit is electrically connected to the verification unit and a manager; the interaction unit is configured to control the manager to display faulty states of the indicating unit according to faulty signals output by the verification unit.

20. The hard disk backplane of claim 15, wherein the first indicator, the second indicator and the third indicator are light emitting diode (LED).

\* \* \* \* \*